United States Patent [19]

Fujiki et al.

[11] Patent Number: 5,504,147
[45] Date of Patent: Apr. 2, 1996

[54] PROCESS FOR PREPARING A LIQUID SILICONE COMPOSITION

[75] Inventors: Hironao Fujiki, Takasaki; Morio Ohashi, Annaka, both of Japan

[73] Assignee: Shin-Etsu Chemical Co., Ltd., Tokyo, Japan

[21] Appl. No.: 396,034

[22] Filed: Feb. 28, 1995

[30] Foreign Application Priority Data

Feb. 28, 1994 [JP] Japan ................................ 6-054481

[51] Int. Cl.$^6$ .............................. C08K 3/36; C08K 5/54; C08K 9/06; C08L 83/07
[52] U.S. Cl. ...................... 524/730; 523/209; 523/212; 524/188; 524/262; 524/492; 524/493; 524/588; 524/862
[58] Field of Search ..................... 524/188, 262, 524/492, 493, 588, 862, 730; 523/209, 212

[56] References Cited

U.S. PATENT DOCUMENTS

| | | | |
|---|---|---|---|
| 4,152,315 | 5/1979 | Lee et al. .......................... | 524/493 |
| 4,427,801 | 1/1984 | Sweet ................................ | 523/212 |
| 4,785,047 | 11/1988 | Jensen .............................. | 524/262 |
| 4,857,564 | 8/1989 | Maxson ............................ | 524/588 |
| 5,039,736 | 8/1991 | Fujiki ............................... | 524/188 |

FOREIGN PATENT DOCUMENTS

| | | |
|---|---|---|
| 61-4855 | 2/1986 | Japan . |
| 2067471 | 7/1981 | United Kingdom . |

*Primary Examiner*—Peter A. Szekely
*Attorney, Agent, or Firm*—Lowe, Price, Leblanc & Becker

[57] ABSTRACT

A process for preparing a liquid silicone composition of the type which comprises (A) a diorganopolysiloxane having a viscosity of 1000 to 100,000 centipoises and having at least two reactive groups, (B) a filler mainly composed of $SiO_2$ having a specific surface area of not smaller than 50 m$^2$/g, (C) a diorganopolysiloxane having a viscosity of from 10 to 1000 centipoises and substantially free of any terminal silanol group, (D) hexamethyldisilazane and/or (E) water is described. In the process, 10 to 100 wt % of the (A) and (C) components and 100% of the (B), (D) and, if present, (E) components are mixed under heating conditions of 100° to 250° C. for a time sufficient to obtain a uniform dispersion. If present, the balances of the (A) and (C) components are subsequently mixed with the dispersion.

10 Claims, No Drawings

PROCESS FOR PREPARING A LIQUID SILICONE COMPOSITION

BACKGROUND OF THE INVENTION

1. Field of the Invention

This invention relates to a process for preparing a liquid silicone composition which ensures a low initial viscosity and is able to suppress an increase of viscosity as time passes during the course of storage and which has improved and lasting release properties when cured.

2. Description of the Prior Art

A number of processes for preparing silicone rubber compositions which make use of silica fillers having a specific surface area of not smaller than 50 $m^2/g$ have been heretofore proposed. For instance, silica fillers are treated with various types of silazane compounds thereby providing silica particles having active surfaces as set out in Japanese Patent Publication No. 58-8703, U.S. Pat. Nos. 4,152,315 and 4,427,801 (corresponding to Japanese Patent Publication No. 63-46786).

On the other hand, for the addition of reactive group-free diorganopolysiloxanes to compositions, a process has been proposed wherein a silicone oil is added to a silicone elastomer composition so as to improve the release properties of the resultant silicone rubber cured product (Japanese Laid-open Patent Application No. 56-106263 (corresponding to British Patent No. 2067471A).

Japanese Patent Publication No. 61-4855 proposes a composition for heat-fixing roll wherein a mixture of aerosil, a hydrophillic silica filler, and a vinyl group-terminated silicone oil are initially thermally treated in the presence of hexamethyldisilazane, to which functionality-free dimethylpolysiloxane is added thereby obtaining the composition. The roll formed of the composition exhibits good releasing properties.

However, the releasing properties of the silicone rubber compositions of the prior art are not satisfactory, coupled with the problem that when the compositions are allowed to stand over a long time (as accelerated under heating conditions), the viscosity inevitably rises.

The fabrication of duplicates using a silicone rubber mold as a reverse matrix has been well known in the art. In practice, such duplicates have been in use as some parts of automobiles and household electric appliances, art objects, and daily necessaries and miscellaneous goods. To this end, a high precision is required for precision parts. From the economical standpoint, importance is placed on the retention of release properties or release durability. On the other hand, a more complicated configuration is duplicated for art objects. This requires improvements of working properties such as a low viscosity and a high tear resistance.

Many attempts have been made on the improvement of the release durability. Fundamentally, reinforcing silica fillers subjected to hydrophobic treatment are used for this purpose. For instance, various types of silazanes are used to treat reinforcing silica therewith. Examples of such silazanes include $(CH_3)_3SiNHSi(CH_3)_3$, $(CH_3)_3SiNHSi(CH_3)_2NHSi(CH_3)_3$, and $(CF_3CH_2CH_2)(CH_3)_2SiNHSi(CH_2CH_2CF_3)(CH_3)_2$. In order to improve the tear strength, other types of silazanes may be used in combination with the above-mentioned ones, including $(CH_3)_2(CH_2=CH)SiNHSi(CH_3)_2(CH=CH_2)$, $(CH_3)_3SiNHSi(CH_3)(CH=CH_2)[OSi(CH_3)_2]_nNH(CH_3)_3$, and $CH_2=CHSi[NHSi(CH_3)_3]_3$. Moreover, hydrophobic silica is also re-treated with these silazanes. It has been found that by these treating procedures, the release durability is improved over those of the cases where non-treated silica fillers are used.

However, the release durability of the existing silicone rubber matrix materials is not satisfactory on comparison with those of epoxy resins and urethane resins which are currently, predominantly employed as a cast resin material. On the other hand, duplicates mainly made of polyester resins are good with respect to the release properties, but with the problem on the working properties such as an initial viscosity of composition.

SUMMARY OF THE INVENTION

It is accordingly an object of the invention to provide a process for preparing a liquid silicone composition which has a low initial viscosity and is improved in working properties while suppressing a rise in viscosity when allowed to stand over a long time.

It is another object of the invention to provide a process for preparing a liquid silicone composition which exhibits good release properties over a long time when cured.

It is a further object of the invention to provide a cured silicone product obtained from the process mentioned above.

The above objects can be achieved according to the invention by a process for preparing a liquid silicone composition of the type which comprises:

(A) 100 parts by weight of a diorganopolysiloxane which has a viscosity of 1000 to 100,000 centipoises at 25° C. and has at least two reactive groups in one molecule;

(B) 15 to 100 parts by weight of a filler mainly composed of $SiO_2$ and having a specific surface area of not less than 50 $m^2/g$;

(C) from 2 to 150 parts by weight of a diorganopolysiloxane which has a viscosity of from 10 to 1000 centipoises at 25° C. and which is substantially free of a silanol group at both ends thereof; and (D) from 1 to 30 parts by weight of a hexamethyldisilazane; wherein a mixture consisting of 10 to 100 weight % of the (A) component, 100 wt % of the (B) component, 10 to 100 weight % of the (C) component, and 100 wt % of the (D) component is thermally treated at a temperature of from 100° to 250° C. for a time sufficient to obtain a uniform dispersion, and further mixing the balance of the components with the mixture when at least one of the components (A) and (C) is left without undergoing the thermal treatment.

Preferably, water is further added to the composition in amounts up to 10 parts by weight. If present, water is added at the stage where the mixture is thermally treated.

In the practice of the invention, when a diorganopolysiloxane having a viscosity of 1000 to 100,000 centipoises at 25° C. and a filler in the form of particles having a specific surface area of not less than 50 $m^2/g$ are mixed under heating conditions to obtain a silicone composition, it is essential to incorporate a diorganopolysiloxane which is substantially free of any terminal silanol group. By this, the resultant composition is mitigated from retrogradation in plasticization with a lowering of its viscosity. In addition, the thus treated silicone composition is able to yield a cured product which is significantly improved in release properties on the surfaces thereof.

DETAILED DESCRIPTION OF THE INVENTION

The respective components used in the process of the invention are now described.

The (A) component is a diorganopolysiloxane having a viscosity of from 1000 to 100,000 centipoises at 25° C. and at least two reactive groups, such as aliphatic unsaturated monovalent hydrocarbon groups and/or silanol groups, in the molecule. Such a diorganopolysiloxane is represented by the general formula, $R^1_a SiO_{(4-a)/2}$ wherein $R^1$ represents a substituted or unsubstituted monovalent hydrocarbon group having from 1 to 12 carbon atoms, preferably from 1 to 8 carbon atoms or a hydroxyl group. The monovalent hydrocarbon groups are, for example, saturated hydrocarbon groups including alkyl groups such as methyl, ethyl, propyl, isopropyl, butyl, isobutyl, tert-butyl, hexyl, cyclohexyl, octyl, decyl and the like, aliphatic unsaturated hydrocarbon groups including alkenyl groups such as vinyl, allyl, propenyl, isopropenyl, butenyl, hexenyl, and the like, aryl groups such as phenyl, tolyl, xylyl, naphthyl and the like, aralkyl groups such as benzyl, phenylethyl and the like, halogen-substituted hydrocarbons such as chloromethyl group, bromomethyl group, 3,3,3-trifluoropropyl group, and the like, and silanol group (i.e. a hydroxyl group bonded to a silicon atom). Although $R^1$'s may be the same or different, the diorganopolysiloxane should have two or more, preferably just two, aliphatic unsaturated hydrocarbon groups or silanol groups on average in one molecule. In the formula, a is a value ranging from 1.9 to 2.4, preferably from 1.95 to 2.2. The diorganopolysiloxane may be linear or may have a branched structure which contains $R^1 SiO_{3/2}$ units wherein $R^1$ has the same meaning as defined above or $SiO_{4/2}$ units. In this connection, the diorganopolysiloxane ordinarily employed is one which has a main chain portion consisting of $R^1_2 SiO_{2/2}$ recurring units with a $R^1_3 SiO_{1/2}$ unit being blocked at both ends of the molecular chain. Although the at least two functional groups present in the molecule may be bonded to a silicon atom at ends of the molecular chain or at a position or positions other than the terminal ends, it is preferred from the standpoint of a curing velocity and the physical properties of a final cured product that the functional groups are bonded to the terminal silicon atoms. The substituents bonded to the silicon atoms may be any groups set out hereinabove. Of these, the vinyl group is preferred in case where the reactive groups used are an aliphatic unsaturated hydrocarbon group and a methyl group is preferred as other substituent.

The diorganopolysiloxane of the type set out above is prepared by subjecting an organocyclopolysiloxane and water to equilibration reaction in the presence of an alkali or acid catalyst. For blocking the ends of the molecular chain with a group other than the silanol group, a hexaorganodisiloxane of the general formula, $R_3 SiOSiR_3$, and/or a hexaorganodisilazane of the general formula, $R_3 SiNHSiR_3$, wherein each R represents an unsubstituted or substituted monovalent hydrocarbon group as defined with respect to $R^1$ but except a hydroxyl group, is further added to the above reaction system, followed by the equilibrium reaction.

Specific examples of the (A) component include those represented by the following formulas

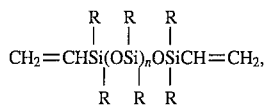

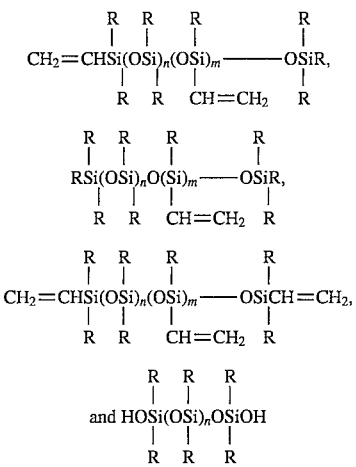

wherein R's have independently the same meaning as defined with respect to $R^1$ except that aliphatic unsaturated hydrocarbon groups are not included, each n is an integer of from 10 to 500 and each m is an integer of from 2 to 100.

The (B) component is a silica filler which consists of a major proportion of $SiO_2$, for example, not less than 90 wt %, preferably not less than 95 wt %, of $SiO_2$, with some other components such as oxides or other compounds of Al, Ca, Fe and the like, or OH group, trimethylsiloxy group $((CH_3)_3 SiO_{1/2}$ unit), dimethylsiloxane group (i.e. $((CH_3)_2 SiO_{2/2}$ unit) and the like which are present in the surfaces of the filler. The filler should have a specific surface area not less than 50 m²/g, preferably from 50 to 400 m²/g when measured by the BET method. The filler is formulated as imparting physical strength when the silicone composition is cured to provide an elastomer. The composition obtained by the process of the invention may be applied to as a so-called molding material and is able to duplicate a matrix or hollow form including reversed tapers. In this regard, high mechanical strength, particularly, a high tear strength, is required. In order to reinforce silicone rubbers, the filler should have a specific surface area of not less than 50 m²/g. Examples of the fillers which are commercially available include hydrophilic silica fillers such as Aerosils 30, 200 and 300, Aluminosilicate (Japan Aerosil Co., Ltd. and Degussa), Cabosils MS-5 and MS-7 (Cabot Corp.), Rheorosils QS-102 and 103 (Tokuyama Soda Co., Ltd.), Nipsil LP (Silica Co., Ltd. of Japan) and the like, and hydrophobic silica fillers such as Aerosils R-812, R812S, R-972 and R-974 (Degussa) Rheorosil MT-10 (Tokuyama Soda Co., Ltd.), Nipsil SS series (Silica Co., Ltd. of Japan) and the like. These fillers may be used singly or in combination. The amount of the (B) ingredient is in the range of 15 to 100 parts by weight, preferably from 15 to 50 parts by weight, per 100 parts by weight of the (A) ingredient. When the amount is less than 15 parts by weight, satisfactory strength may not be expected. On the other hand, when the amount exceeds 100 parts by weight, the resultant mixtures has too high a viscosity, with the possibility that the resultant composition may not be employed as a casting material.

The (C) component is a diorganopolysiloxane which has a viscosity of 10 to 1000 centipoises at 25° C. and is substantially free of any terminal silanol group. The diorganopolysiloxane is represented by the general formula, $R^2_b SiO_{(4-b)/2}$, wherein $R^2$'s may be the same or different and independently represent a substituted or unsubstituted monovalent hydrocarbon group having from 1 to 8 carbon atoms, preferably from 1 to 6 carbon atoms except an aliphatic unsaturated hydrocarbon group, or a hydroxyl group provided that $R^2$'s are not a hydroxyl group when $R_2$ is bonded to a silicon atom at ends of the molecular chain, i.e. $R^2$ is derived from $R^2{}_3SiO_{1/2}$ units. The monovalent hydrocarbon groups are, for example, saturated hydrocarbon groups including alkyl groups such as methyl, ethyl, propyl, isopropyl, butyl, isobutyl, tert-butyl, pentyl, hexyl, cyclohexyl, octyl and the like, aryl groups such as phenyl, tolyl, xylyl and the like, aralkyl groups such as benzyl, phenyl ethyl and the like, and halogen-substituted hydrocarbon groups such as chloromethyl, bromomethyl, 3,3,3-trifluoropropyl and the like, and a silanol group (i.e. a hydroxyl group bonded to a silicon atom), h is a value of 1.9 to 2.4. Although the diorganopolysiloxane may be linear or branched as containing $R^2SiO_{3/2}$ units or $SiO_{4/2}$ units, it is usual to use a diorganopolysiloxane which has a main chain portion consisting of $R^2{}_2SiO_{2/2}$ recurring units and blocked at both ends of the chain with a triorganosilyl group of the formula, $R^2{}_3SiO_{1/2}$ unit. More particularly, the diorganopolysiloxanes include dimethylpolysiloxane terminated with a trimethylsilyl group at both ends thereof, and phenylmethylpolysiloxane and trifluoropropylmethylpolysiloxane wherein part of the methyl groups in the dimethylsiloxane units of the dimethylpolysiloxane is substituted with a phenyl or trifluoropropyl group.

The addition of the diorganopolysiloxanes which are substantially free of any terminal silanol group, to silicone compositions is proposed, for example, in Japanese Laidopen Paten Application No. 56-106263 (corresponding to British Patent Specification 2067471A) and Japanese Patent Publication No. 61-4855. In these publications, reactive group-bearing diorganopolysiloxane and finely divided silica are not thermally treated at all. Alternatively, after thermal treatment, a functionality-free oil is added to the resultant mixture. In short, any publications do not teach the thermal treatment of a composition comprising a diorganopolysiloxane which is substantially free of any terminal silanol group as in the present invention. More particularly, it is important in the practice of the invention to subject a diorganopolysiloxane substantially free of any terminal silanol group, a diorganopolysiloxane having reactive groups and a finely divided silica filler to thermal treatment. By this, the resultant silicone composition has good storage stability and working properties along with a good retention of release properties after curing.

The terms "substantially free of any terminal silanol group" is intended to mean that there is little possibility that the terminal silanol group is not present at all in the compound in view of the manner of preparation of the (C) component. In practice, the silanol group is inevitably present in amounts not larger than approximately 200 ppm. However, such a very small amount of the terminal silanol is not considered to impede the purposes of the present invention. Although the (C) component should have substantially no terminal silanol group, the presence of silanol groups at side chains or portions other than the terminal ends is not critical. In other words, the hydroxyl group may exist as a substituent of the siloxane units contained in the polysiloxane chain, not at terminal ends, such as $R^2{}_2SiO_{2/2}$ units or $R^2SiO_{3/2}$ units. For instance, the silanol groups introduced in the form of $R'Si(OH)O_{2/2}$ units wherein R' represents a group as defined by $R^2$ but except the hydroxyl group and $Si(OH)O_{3/2}$ units are rather effective in view of the fact that the viscosity of the resultant composition lowers.

The (C) component should have a viscosity of from 10 to 1000 centipoises, preferably from 30 to 800 centipoises at 25° C. When the viscosity is smaller than 10 centipoises, undissolved or undispersed globules of the (C) component are liable to form. This undesirably requires too high a shear force to obtain a uniform composition and thus is not favorable in practical applications. On the other hand, when the viscosity exceeds 1000 centipoises, the viscosity of the resultant composition undesirably increases as a whole, with the tendency toward the shortage of fluidity. The (C) component should be present in an amount of from 2 to 150 parts by weight per 100 parts by weight of the (A) ingredient. If the amount is less than 2 parts by weight, satisfactory characteristic properties may not be obtained. Over 150 parts by weight, cured silicone moldings become brittle, with the fear that they cannot stand practical use.

The hexamethyldisilazane of the (D) component is a compound of the formula, $(CH_3)_3SiNHSi(CH_3)_3$. It is assumed that the filler of the (B) component is surface-treated with the silazane. In addition, it is considered that the disilazane compound serves to facilitate the fluidization of the composition. In order to improve the tensile strength and the modulus of elasticity of cured product, other types of silazane compounds having at least one aliphatic unsaturated hydrocarbon group such as a vinyl group therein should preferably be used. Such compounds include, for example, $(CH_3)_2(CH_2=CH)SiNHSi(CH_3)_2(CH=CH_2)$, $(CH_3)_3SiNHSi(CH_3)(CH=CH_2)NHSi(CH_3)_3$, $(CH_3)_3SiNHSi(CH_3)(CH=CH_2)[OSi(CH_3)_2]_nNHSi(CH_3)_3$ wherein n=1 to 100, and $CH=CH_2Si[NHSi(CH_3)_3]_3$. Moreover, there may be used, instead of the hexamethyldisilazane, organodisilazanes and organotrisilazanes having no aliphatic unsaturated hydrocarbon group in the molecules, such as $(CH_3)_3SiNHSi(CH_3)_2NH(CH_3)_3$, $(CF_3CH_2CH_2)(CH_3)_2SiNHSi(CH_2CH_2CF_3)(CH_3)_2$ and the like.

The amount of the (D) component is added in an amount of from 1 to 30 parts by weight, preferably from 1 to 10 parts by weight. per 100 parts by weight of the (A) component. If the amount is less than 1 part by weight, the surface treatment of the filler of the (D) ingredient is not satisfactory. On the other hand, when the amount exceeds 30 parts by weight, it becomes excessive in treatment of the filler therewith with poor economy. If added, other type of silazane is used in an amount of from 0.01 to 5 parts by weight per 100 parts by weight of the (A) component.

The above (A) to (D) are essential components in the process of the invention. Water may be added, as component (E), to the composition in order to accelerate the decomposition of the silazane compound of the (D) component, thereby facilitating the treating speed for the composition. The amount is not critical. If a high speed treatment is required, water is used in an amount of up to 10 parts by weight, preferably from 1 to 10 parts by weight, per 100 parts by weight of the (A) component. If the amount exceeds 10 parts by weight, the treating speed does not increase further, but it takes a longer time before removal water after completion of the thermal treatment of the silicone composition, thus being not favorable from the standpoint of the production process.

In accordance with the process of the invention, the components (A) to (D) are mixed in such a way that 10 to 100 wt %, preferably 50 to 100 wt %, of the (A) component, 100 wt % of the (B) component, 10 to 100 wt % of, preferably 50 to 100 wt %, of the (C) component, and 100 wt % of the (D) component are mixed. The, the mixture is thermally treated at a temperature of from 100° to 250° C. The process of the invention differs from known processes in that a diorganopolysiloxane of the (C) component which is substantially free of any terminal silanol group is added at the stage where the thermal treatment is effected. If water is added, 100 wt % of water is added at the time of the mixing. As will be apparent from the above, all the components (A) to (D) with or without the (E) component may be mixed together and then thermally treated at a temperature defined above. Alternatively, part of the component (A) and part of the (C) component may be mixed with 100 wt % of both components (B) and (D) with or without the (E) component and then thermally treated. Thereafter, the balances of the (A) and (C) components are further mixed with the resultant mixture.

When the component (A) is wholly added an initial mixing stage, the resultant composition may have a higher viscosity and a lower fluidity than in the case where part of the component (A) is initially added and is subjected to thermal treatment. Presumably, this is because the initial mixing ration between the components (A) and (B) influences the viscosity of a final composition although depending on the type of mixing device. With the (C) component, the addition of the whole amount at an initial stage prior to or at the thermal treatment presents no problem. If the (C) component is added after division into two portions, it is expected that the remaining portion will facilitate bleeding thereof along with other optionally added components such as functionality-free diorganopolysiloxane having a viscosity of at least 1000 centipoises at 25° C. when the resultant composition is cured as will be discussed hereinafter.

The thermal treatment is effected at a temperature of from 100° to 250° C., preferably from 120° to 200° C. for a time sufficient to obtain a uniform dispersion. The mixing time is preferably from 30 minutes to 8 hours, more preferably from 1 to 4 hours. The mixers used may be kneaders, gate mixers, twin-screw extruders and the like which are ordinarily used for the preparation of this type of composition.

If residual components are present, they are further mixed with the thermally treated mixture to obtain a silicone composition. This mixing is effected by a usual manner. In the process of the invention, it is essential to add a part or all of the functionality-free polysiloxane of the component (C) to the mixture of other components of the composition at the time of thermal treatment. The residual components to be added after completion of the thermal treatment may be added immediately after the thermal treatment under conditions where the temperature of the thermally treated mixture does not lower or under conditions where a once treated mixture is cooled down to normal temperatures ranging, for example, from 10° to 30° C. In practice, after completion of the thermal treatment, a heating device used is turned off, under which the residual components, if present, are added to the mixture.

In order to provide a cured product of the composition which permits lighter release, it is preferred that aside from the component (C), another type of functionality-free diorganopolysiloxane having a viscosity of at least 1000 centipoises at 25° C. is optionally added to the composition of the invention after completion of the thermal treatment when the temperature of the mixture is cooled down to 60° C. or below, e.g. 10° to 60° C. In the case, the optionally added functionality-free diorganopolysiloxanes may be used singly or in combination of oils having different molecular weight distributions. Taking the fluidity of the composition into account, it is preferred to use a functionality-free diorganopolysiloxane having a viscosity of at least 1000 centipoises should preferably have a main chain consisting of the same type of recurring unit as the reactive organopolysiloxane of the (A) component, e.g. a linear dimethylpolysiloxane blocked with a triorganosilyl group such as a trimethylsilyl group, at both ends thereof. For this purpose, the optionally added functionality-free diorganopolysiloxane should have a molecular weight substantially equal to or greater than the reactive organopolysiloxane (A) used in the composition. Where the functionality-free diorganopolysiloxanes are used in combination, at least one of the combination may have such a molecular weight as set out above. By this, the functionality-free diorganopolysiloxane becomes easier to bleed thereby ensuring easier release after curing of the composition, like the after-addition of part of the (C) component as set out hereinbefore. In order to control the degree of bleeding of the diorganopolysiloxane oil as a function of time, it is possible to mix several types of the functionality-free diorganopolysiloxane oils having different molecular weight distributions.

The liquid silicone composition prepared according to the process of the invention is cured to provide a cured silicone rubber. In the case, where the (A) component consists of a diorganopolysiloxane having at least two aliphatic unsaturated hydrocarbon group as the reactive group in one molecule, an organohydrogenpolysiloxane is usually used as a crosslinking agent along with a platinum catalyst, thereby facilitating curing of the composition. The organohydrogenpolysiloxane reacts with the constituent component (A) and serves as a crosslinking agent. The molecular structure is not critical and includes various types of hitherto prepared linear, cyclic, branched and the like structures as well as resinous ones having a three-dimensional network structure. If this agent is used, it is essential that the organohydrogenpolysiloxane have at least two, preferably three or more, hydrogen atoms directly bonded to silicon atom or atoms (i.e. SiH groups). The organohydrogenpolysiloxane compound may have a substituent other than a hydrogen atom and bonded to the silicon atoms. Examples of the substituent may be an unsubstituted or substituted monovalent hydrocarbon group defined with respect to the diorganopolysiloxane of the (A) component. Preferably, an organohydrogenpolysiloxane should have three hydrogen atoms directly bonded to silicon atoms and is of the general formula, $R^3_d H_e SiO_{4-(d+e)/2}$, wherein $R^3$ represents an alkyl group such as methyl, ethyl, propyl or butyl, an aryl group such as phenyl, tolyl or the like, an aliphatic unsaturated group including an alkenyl group having from 2 to 8 carbon atoms such as vinyl, allyl, propenyl, butenyl or the like, or a halogen-substituted monovalent hydrocarbon group such as 3,3,3-trifluoropropyl provided that it is preferred not to use the aliphatic unsaturated group as $R^3$, d and e are such that $0.002 \leq e \leq 1.0$ and $1.8 < d < 2$ provided that $1.0 < d+e \leq 3.0$. The amount of the organohydrogenpolysiloxane is preferably in the range of 0.4 to 4 equivalents, preferably from 0.8 to 2 equivalents, per unit aliphatic unsaturated hydrocarbon group contained in the (A) component. If the amount is less than 0.4 equivalents, the crosslinking density becomes too low, adversely influencing the heat resistance of the resultant cured silicone rubber. On the other hand, when the amount exceeds 4 equivalents, the problem of foaming is involved owing to the dehydrogenation reaction, adversely influencing the heat resistance as well.

The platinum catalyst used as a catalyst for the reaction includes platinum or a platinum group element compound promotes the addition reaction (hydrosilation reaction) between the (A) component and the organohydrogenpolysiloxane. The platinum catalysts may be ones known in the art and include, for example, platinum black, chloroplatinic acid, alcohol-modified products of chloroplatinic acid, complexes between chloroplatinic acid and olefins, aldehydes, vinylsiloxanes or acetylene alcohols, and the like. The amount of the catalyst may appropriately vary depending on a desired curing velocity and is usually in the range of from 0.1 to 1000 ppm, preferably from 1 to 200 ppm, calculated as platinum, based on the (A) component.

The organohydrogenpolysiloxane and the platinum catalyst are preferably formulated in the composition after the mixing under thermal treating conditions.

If it is necessary to appropriately control a time before curing of the composition, the composition may further comprise controlling compounds including vinyl group-containing organopolysiloxanes such as vinylcyclotetrasiloxane, triallylisocyanurate, alkyl maleates, acetylene alcohols and silane and siloxane modified products thereof, hydroperoxides, tetramethylethylenediamine, benzotriazoles, and mixtures thereof.

Moreover, where the cured product of the composition is improved in mechanical strength without increasing the viscosity of the composition, a silicone resin which is fundamentally made of $SiO_2$ and $R^1{}_3SiO_{1/2}$ units wherein $R^1$ has the same meaning as defined before and which contains at least one alkenyl group, such as a vinyl group, in one molecule and which is soluble in silicone oils may be added to the composition in an amount of from 1 to 20 parts by weight per 100 parts by weight of the (A) component. This component may be added during the course of the thermal treatment or after completion of the thermal treatment.

The (A) component may be a diorganopolysiloxane having at least two silanol group as the reactive group in one molecule. In this case, organosilanes or organosiloxanes having at least three hydrolyzable groups in the molecule, including alkoxysilanes or alkoxypolysiloxanes, may be used as a crosslinking agent. A curing catalyst may be organotin, organolead and organotitanium compounds ordinarily used for condensation-type silicone RTV's (room temperature vulcanizable or vulcanizing).

As mentioned above, the crosslinking agents should have, in one molecule, at least three hydrolyzable functional groups which react with the silanol group of the diorganopolysiloxane (A) to provide an elastomer. Silanes or siloxanes used as the crosslinking agent should have, as the hydrolyzable functional group, alkoxy groups, acyloxy group, alkenyloxy group and alkoxyalkenyloxy group each having from 1 to 8 carbon atoms, preferably from 1 to 6 carbon atoms, and directly bonded to the silicon atom or atoms. The silanes or siloxanes may have a substituent or substituents other than the hydrolyzable group. The substituent may be ones as defined with respect to $R^2$ and is, for example, an unsubstituted or substituted monovalent hydrocarbon group having from 1 to 8 carbon atoms, including an alkyl group such as a methyl group, an alkenyl group such as a vinyl group, an aryl group such as a phenyl group, and the like. Specific examples include methyltrimethoxysilane, vinyltrimethoxysilane, phenyltrimethoxysilane, vinyltriethoxysilane, tetraethoxysilane, tetra(n-propoxy)silane, methyltris(propenoxy)silane, vinyltris(propenoxy)silane, methyltris(propenoxy)silane, vinyltris(propenoxy)silane, phenyltris(1-methoxy-2-methylpropenoxy)silane and hydrolyzates thereof, and mixtures thereof. The amount of the crosslinking agent is in the range of from 0.5 to 20 parts by weight, preferably from 1 to 10 parts by weight, per 100 parts by weight of the silanol group-containing diorganopolysiloxane of the (A) component. If the amount is less than 0.5 parts by weight, the composition does not cure and an elastomer cannot be thus obtained. Of course, mechanical strength is not satisfactory. When the amount exceeds 20 parts by weight, the resultant elastomer becomes too hard with the possibility that it cannot stand use.

The curing catalysts include, for example, metal salts of organic acids such as dibutyltin dilaurate, dibutyltin dibenzylmaleate, dibutyltin dioctoate, iron stearate, lead octylate and the like, titanates such as tetraisopropyl titanate, titanium chelating compounds such as titanium acetylacetonate, and mixtures thereof. If the amount of the curing agent is too small, the function as the agent is not shown satisfactorily, taking a prolonged time. In addition, the degree of curing at the deep portion of a rubber layer becomes unsatisfactory. On the other hand, the amount is too large, the heat resistance after curing undesirably lowers. If added, the catalyst is in the range of 0.1 to 10 parts by weight, preferably from 0.1 to 5 parts by weight, per 100 parts by weight of the (A) component.

The crosslinking agent and the curing catalyst should preferably be added to the composition after completion of the thermal treatment. In this case, in order to control the curing reaction velocity, a curing retarder may be added. Such retarders include organopolysiloxanes having a hydroxysilyl group at one or both ends thereof and having not larger than 50 carbon atoms, organic acids, and inorganic acids. The retarder should preferably be added to the composition after the mixing under thermal treating conditions but may be added prior to the thermal treatment.

The composition may further comprise various types of additives in amounts not impeding the effect of the invention. Examples of the additives include extending reinforcing agents or defoaming improvers such as quartz powder, alumina powder and the like, inorganic pigments such as cobalt blue, colorants such as organic dyes, and heat-resistant and flame-resistant improvers such as cesium oxide, zinc carbonate, manganese carbonate, iron oxide red, titanium oxide, carbon black and the like. These additives are not critical with respect to the order of addition thereof. Usually, the additives are added to the composition after completion of the thermal treatment but may be added prior to the thermal treatment. Especially, quartz or alumina may be formulated prior to the thermal treatment.

The composition prepared according to the process of the invention has a low initial viscosity and is suppressed from an increase in viscosity as time passes, thereby ensuring good storage stability and good working properties. Once cured, the composition exhibits a significantly improved release properties over a long time.

The invention is more particularly described by way of examples, which should not be construed as limiting the invention thereto.

Examples 1 to 4 and Comparative Example 1

A dimethylpolysiloxane (a) blocked with a vinyldimethylsilyl group at both ends thereof and having a viscosity of about 5000 centipoises at 25° C., a dimethylpolysiloxane (b) blocked with a trimethylsilyl group at both ends thereof and having a viscosity of 100 centipoises, a silica powder (C) of Aerosil 200 (Aerosil Co., Ltd. of Japan ) or precipitated silica FK 160 (Degussa Corp.) having a specific surface area of about 200 m$^2$/g when determined according to the BET Method were charged into a kneader in amounts indicated in Table 1, respectively, followed by further addition of hexamethyldisilazane and water under sufficient agitation. The mixing was continued over 1 hour. Thereafter, the temperature was raised to 150° C., followed by further agitation for 2 hours. Subsequently, the mixture was cooled down to normal temperatures ranging from about 10° to 30° C. to obtain compositions. In Example 4, after cooling down, dimethylpolysiloxane blocked with a trimethylsilyl group at both ends thereof and having a viscosity of 100,000 centipoises at 25° C. was finally added.

The respective compositions were subjected to measurement of an initial viscosity by use of the Brookfield viscometer, with the results shown in Table 1.

500 g of each of the compositions was then admixed with 25 g of methylhydrogenpolysiloxane of the average formula of $HSi(CH_3)_2[OSi(CH_3)_2]_6[OSiH(CH_3)]_4HSi(CH_3)_2$, 2 g of 1,3,5,7-tetramethyl- 1,3,5,7-tetravinylcyclotetrasiloxane and 100 ppm, as platinum, of a chloroplatinic acid-octyl alcohol complex, followed by sufficient agitation and defoaming in vacuum. Thereafter, the resultant composition was cured at 60° C. for 2 hours to make a sheet, followed by measurements of physical properties according to the methods described in JIS K6301.

Moreover, each of the admixed compositions was used to make a matrix or hollow mold of a recessed form capable of duplicating 50 mm×50 mm×5 mm resin moldings. An epoxy resin was cast in the recessed portion of the matrix and cued at 60° C. for 1 hour to obtain an epoxy resin molding. This molding was subjected to measurement of a surface gloss. After repetition of the casting twenty times using the matrix, the resulting molding was also subjected to measurement of the surface gloss and was evaluated with respect to evaluation of release properties.

The surface gloss was measured by irradiating light from a gloss checker IG-301 Horiba Mfg. Co., Ltd. on the flat surface of the molding sample. More particularly, the light was applied at an incident angel of 60° relative to the surface to be measured and the reflected light was received at an angle of reflection of 60° to determine a light intensity ratio between the incident light and the reflected light.

The results are shown in Table 1.

TABLE 1

| Component (parts by weight) | Comparative Example 1 | Example 1 | Example 2 | Example 3 | Example 4 |
|---|---|---|---|---|---|
| Components formulated under heating conditions: | | | | | |
| (a) | 450 | 400 | 300 | 400 | 400 |
| (b) | | 50 | 100 | 50 | 50 |
| hexamethyldisilazane | 50 | 50 | 50 | 50 | 60 |
| water | 25 | 25 | 25 | 25 | 25 |
| Aerosil 200 | 250 | 250 | 250 | | 250 |
| FK160 | | | | 250 | |
| Component added after the formulation: | | | | | 50 |
| dimethylpolysiloxane (100,000 cps.) | | | | | |
| Viscosity of Composition (poises) | 820 | 620 | 380 | 270 | 580 |
| Physical Properties After Curing: | | | | | |
| hardness (JIS A) | 43 | 41 | 38 | 45 | 38 |
| elongation (%) | 300 | 320 | 300 | 260 | 350 |
| tensile strength (kg/cm²) | 69 | 65 | 57 | 55 | 63 |
| tear strength (kg/cm) | 21 | 19 | 19 | 9 | 20 |
| surface gloss | | | | | |
| initial | 98 | 84 | 83 | 26 | 80 |
| after 20 cycles of molding | 10 | 58 | 82 | 20 | 72 |
| ease in release of molding after 20 cycles of molding | not easy | easy | easy | very easy | very easy |

Examples 5 to 8 and Comparative Examples 2 to 4

Dimethylpolysiloxane (I) blocked with a hydroxydimethylsilyl group at both ends thereof and having a viscosity of about 20,000 centipoises at 25° C., each of dimethylpolysiloxanes terminated with a trimethylsilyl group and having, respectively, viscosities of 100 centipoises (II), 350 centipoises (III) and 1000 centipoises (IV) at 25° C., and 250 g of Aerosil 200 (Japan Aerosil Co., Ltd.) having a specific surface area of about 200 m²/g were charged into a kneader in amounts indicated in Table 2, followed by further addition of 50 g of hexamethyldisilazane and 25 g of water under sufficient agitation and mixing for 1 hour. Thereafter, the mixture was raised to a temperature of 150° C., at which it was mixed for further 2 hours. Thereafter, the dimethylpolysiloxanes (I) and (II) were, respectively, further added to each mixture in amounts indicated in Table 2, followed by cooling down to normal temperatures to obtain compositions of Examples 5 to 8.

For comparison, the general procedure set out above was repeated using dimethylpolysiloxane (V) blocked with a trimethylsilyl group at both ends thereof and having a viscosity of 10,000 centipoises at normal temperatures and dimethylpolysiloxane (VI) blocked with a hydroxydimethylsiloxy group at both ends thereof and having a viscosity of 30 centistokes at normal temperatures (Comparative Examples 2, 3).

Moreover, the general procedure of Examples 5 to 8 was repeated except that the dimethylpolysiloxane (I) was not formulated at the time of the heating but was added after completion of the heating, thereby obtaining a composition (Comparative Example 4).

The thus obtained compositions were each subjected to measurement, at 25° C., of an initial viscosity and a viscosity after standing under conditions of 100° C. and five days by means of the Brookfield viscometer.

500 g of each of the compositions of the examples and the comparative examples was mixed with 10 g of ethyl polysilicate (EPS 40 commercially available from (Tama Chemical Co., Ltd.) and 5 g of dibutyltin dilaurate, followed by sufficient agitation and defoaming under reduced pressure. Thereafter, the composition was cured under conditions of 25° C. and 72 hours to make a sheet and measure physical properties according to the method described in JIS K6301. The results are shown in Table 2.

TABLE 2

| | Example | | | Comp. Ex. | Example | Comp. Ex. | |
|---|---|---|---|---|---|---|---|
| | 5 | 6 | 7 | 2 | 8 | 3 | 4 |
| Components formulated under heating conditions: | | | | | | | |
| (I) (g) | 200 | 200 | 200 | 200 | 100 | 200 | 400 |
| (II) | 200 | | | | 300 | | |
| (III) | | 200 | | | | | |
| (IV) | | | 200 | | | | |
| (V) | | | | 200 | | | |
| (VI) | | | | | | 200 | |
| Aerosil 200 | 250 | 250 | 250 | 250 | 250 | 250 | 250 |
| Components added after the heating: | | | | | | | |
| (I) | 200 | 200 | 200 | 200 | 300 | | |
| (II) | 100 | 100 | 100 | 100 | | 300 | 300 |
| Viscosity (Poises) | | | | | | | |
| initial | 420 | 520 | 690 | 980 | 480 | no | 1080 |

TABLE 2-continued

|  | Example | | | Comp. Ex. 2 | Example 8 | Comp. Ex. | |
|---|---|---|---|---|---|---|---|
|  | 5 | 6 | 7 | | | 3 | 4 |
| after standing under conditions of 100° C. and 5 days | 660 | 700 | 820 | 1080 | 490 | flowing no flowing | 2190 |
| Physical properties after curing: | | | | | | | |
| hardness (JIS A) | 24 | 24 | 25 | 22 | 24 | 38 | 30 |
| elongation (%) | 470 | 540 | 500 | 580 | 490 | 250 | 370 |
| tensile strength (kg/cm$^2$) | 41 | 48 | 48 | 43 | 39 | 18 | 45 |
| tear strength (kg/cm) | 23 | 26 | 31 | 21 | 25 | 6 | 22 |

As will be apparent from the results of Tables 1 and 2, the compositions prepared according to the process of the invention have a low initial viscosity and are unlikely to increase in viscosity as time passes, thus having good storage stability and working properties. When the compositions are cured, the release properties are significantly improved.

What is claimed is:

1. A process for preparing a liquid silicone composition which comprises:

(A) 100 parts by weight of a diorganopolysiloxane which has a viscosity of 1000 to 100,000 centipoises at 25° C. and has at least two reactive groups in one molecule;

(B) 15 to 100 parts by weight of a filler mainly composed of SiO$_2$ and having a specific surface area of not less than 50 m$^2$/g;

(C) from 2 to 150 parts by weight of a diorganopolysiloxane terminated with a trimethylsilyl group at each end thereof and having a viscosity of from 10 to 1000 centipoises at 25° C.; and (D) from 1 to 30 parts by weight of hexamethyldisilazane; wherein a mixture consisting of 10 to 100 weight % of the (A) component, 100 wt % of the (B) component, 10 to 100 weight % of the (C) component, and 100 wt % of the (D) component is thermally treated at a temperature of from 100° to 250° C. for a time sufficient to obtain a uniform dispersion, and further mixing the balance of the components with the mixture when at least one of the components (A) and (C) is left without undergoing the thermal treatment.

2. A process according to claim 1, wherein all the components (A) to (D) are mixed at one time and thermally treated.

3. A process according to claim 1, wherein the time ranges from 30 minutes to 8 hours.

4. A process according to claim 1, wherein said composition further comprises up to 10 parts by weight of water and said water is added at a stage of the thermal treatment.

5. A process according to claim 1, wherein the component (A) consists of a diorganopolysiloxane of the following general formula $$R^1_a SiO_{(4-a)/2}$$

wherein R$^{1'\!s}$ independently represent an unsubstituted or substituted monovalent hydrocarbon group having from 1 to 12 carbon atoms or a hydroxyl group, and a is a value of from 1.9 to 2.4.

6. A process according to claim 1, wherein the component (C) consists of a diorganopolysiloxane of the following general formula $$R^2_b SiO_{(4-b)/2}$$

wherein R$^2$ represents an unsubstituted or substituted monovalent hydrocarbon group, except aliphatic unsaturation, having from 1 to 8 carbon atoms or a hydroxyl group provided that R$^2$ represents the monovalent hydrocarbon group when R$^2$ is bonded to a silicon atom at ends of a molecular chain of the diorganopolysiloxane, and b is a value of from 1.9 to 2.4.

7. A process according to claim 6, wherein said diorganopolysiloxane has a silanol group at side chains.

8. A process according to claim 1, wherein said composition further comprises 0.01 to 5 parts by weight of a silazane compound selected from the group consisting of (CH$_3$)$_2$(CH$_2$=CH)SiNHSi(CH$_3$)$_2$(CH$_2$=CH), (CH$_3$)$_3$SiNHSi(CH$_3$)(CH=CH$_2$)NHSi(CH$_3$)$_3$, (CH$_3$)$_3$SiNHSi(CH$_3$)(CH=CH$_2$)[OSi(CH$_3$)$_2$]$_n$NHSi(CH$_3$)$_3$ wherein n=1 to 100, and CH$_2$=CHSi[NHSi(CH$_3$)$_3$]$_3$.

9. A process according to claim 1, wherein when the (A) component consists of a diorganopolysiloxane having at least two aliphatic unsaturated hydrocarbon groups in one molecule, an organohydrogenpolysiloxane and a platinum catalyst are further added to said mixture.

10. A process according to claim 1, wherein when the (A) component consists of a diorganopolysiloxane having at least two silanol groups in one molecule, a crosslinking agent selected from the group consisting of alkoxysilanes and alkoxypolysiloxanes and an organometal compound are further added to said mixture.

* * * * *